United States Patent
Fichter et al.

(10) Patent No.: US 12,506,769 B2
(45) Date of Patent: Dec. 23, 2025

(54) VIRTUALIZATION-BASED CONTROLLER FOR INDUSTRIAL CONTROL SYSTEM RESILIENCY

(71) Applicant: The Johns Hopkins University, Baltimore, MD (US)

(72) Inventors: Dane G. Fichter, Ellicott City, MD (US); James D. Cervini, Waxhaw, NC (US)

(73) Assignee: The Johns Hopkins University, Baltimore, MD (US)

(*) Notice: Subject to any disclaimer, the term of this patent is extended or adjusted under 35 U.S.C. 154(b) by 188 days.

(21) Appl. No.: 18/169,045

(22) Filed: Feb. 14, 2023

(65) Prior Publication Data
US 2023/0379353 A1    Nov. 23, 2023

(51) Int. Cl.
*H04L 9/40* (2022.01)
*G06F 9/455* (2018.01)

(52) U.S. Cl.
CPC ...... *H04L 63/1441* (2013.01); *G06F 9/45558* (2013.01); *H04L 63/0442* (2013.01); *H04L 63/1416* (2013.01); *G06F 2009/45587* (2013.01); *G06F 2009/45595* (2013.01)

(58) Field of Classification Search
CPC ............. H04L 63/1441; H04L 63/0442; H04L 63/1416; G06F 9/45558; G06F 2009/45587; G06F 2009/45595
See application file for complete search history.

(56) References Cited

U.S. PATENT DOCUMENTS

| | | | | |
|---|---|---|---|---|
| 2005/0149729 | A1* | 7/2005 | Zimmer | H04L 63/061 713/168 |
| 2007/0110245 | A1* | 5/2007 | Sood | H04L 9/0844 380/270 |
| 2009/0077413 | A1* | 3/2009 | Dake | H04L 63/1408 714/4.1 |

(Continued)

OTHER PUBLICATIONS

T. Cruz, P. Simões and E. Monteiro, "Virtualizing Programmable Logic Controllers: Toward a Convergent Approach," in IEEE Embedded Systems Letters, vol. 8, No. 4, pp. 69-72, Dec. 2016, doi: 10.1109/LES.2016.2608418. (Year: 2016).*

(Continued)

*Primary Examiner* — Robert B Leung
(74) *Attorney, Agent, or Firm* — Sung T. Kim

(57) ABSTRACT

Disclosed herein are method, computing device, and computer-readable medium embodiments for providing system resiliency in an Industrial Control System (ICS) having an operational technology (OT) network. An orchestration engine can determine a security alert indicating a security attack against an affected controller, and instruct a virtualization server to instantiate a virtual controller performing the set of functions performed by the affected controller. The orchestration engine can quarantine the affected controller by disabling the set of connections between the affected controller, the orchestration engine, and the set of operational components. The orchestration engine can route communication traffic of the communication network intended for the affected controller to the virtual controller, and enable the virtual controller to control operations of the set of operational components of the OT network that were controlled by the affected controller.

21 Claims, 7 Drawing Sheets

(56) References Cited

U.S. PATENT DOCUMENTS

| | | | | |
|---|---|---|---|---|
| 2015/0326589 A1* | 11/2015 | Smith | ............... | H04L 63/02 |
| | | | | 726/1 |
| 2018/0139099 A1* | 5/2018 | Amin | ............... | H04L 47/125 |
| 2018/0343237 A1* | 11/2018 | Wiseman | ............ | H04L 63/0853 |
| 2020/0104503 A1* | 4/2020 | Iwasaki | ............ | G06F 21/552 |
| 2024/0385592 A1* | 11/2024 | Waltl | ............ | G05B 19/056 |

OTHER PUBLICATIONS

A. F. Piedrahita, V. Gaur, J, Giraldo, A.. A. Cardenas, and S.J. Rueda. "Virtual incident response functions in control systems," Computer Networks. Apr. 22, 2018;135:147-59. (Year: 2018).*

* cited by examiner

VIRTUALIZATION-BASED CONTROLLER FOR INDUSTRIAL CONTROL SYSTEM RESILIENCY

CROSS REFERENCE TO RELATED APPLICATIONS

The current application claims priority to U.S. Provisional Patent Application No. 63/344,812, entitled "Improving Industrial Control System Resiliency through Virtualization," filed on May 23, 2022, and incorporated by reference herein in its entirety.

BACKGROUND

Industrial Control Systems (ICS) can include an operational technology (OT) network, operational components of which can perform cyber-physical functions. In the context of critical infrastructure, these functions are vital to modern life. Controllers, such as programmable logic controllers (PLCs), are commonly used in ICS environments and execute the operational logic of the systems. Due to the continued escalation of cyberattacks targeting ICS and their controllers, techniques strengthening the trust and resilience of ICS are desired.

SUMMARY

Some aspects of this disclosure relate to apparatuses and methods for implementing techniques for an orchestration engine and a virtualization server of industrial control systems (ICS) to retain functionality of the ICS, and further provide rapid response and recovery capabilities, when one or more components of the ICS are under security attack. Embodiments herein can utilize virtualization, cryptographic attestation, software defined networking, security orchestration, and more, to advance the trust and resilience of controllers while facilitating integration of virtual controllers into existing systems to maintain the functionality of the ICS under attack.

Some aspects of this disclosure relate to operations performed by a cybersecurity solution for an ICS that includes an orchestration engine and a virtualization server to control operational components of an operational technology (OT) network of the ICS. When an identification, protection, and detection (IPD) framework generates an alert indicating a cyberattack against a controller of the ICS or an operational component of the OT network, this alert will be passed to the orchestration engine. The orchestration engine can command the virtualization server to instantiate a virtual machine, a virtual controller, or a container running a simulated version of the operations and logic of the affected controller. Once the virtual controller has been instantiated, the orchestration engine may use software-defined networking rules and control of analog connections to effectively quarantine the affected controller from both the network of the ICS and operational components. Afterwards, the orchestration engine can route all traffic intended for the affected controller to the newly spawned virtual controller and give the virtual controller control of the relevant operational components.

In some embodiments, the orchestration engine can perform attestation of the virtual controller and the virtualization server based on a predetermined cryptographic key for the virtualization server. In some embodiments, the orchestration engine can perform attestation before routing communication traffic intended for the affected controller to the virtual controller. In some embodiments, the predetermined cryptographic key can be an endorsement key that is an asymmetric key uniquely determined for a trusted platform module (TPM) of the virtualization server. The attestation of the virtual controller and the virtualization server can be performed based on the endorsement key along with an attestation identity key (AIK) pair including an AIK private key and an AIK public key.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
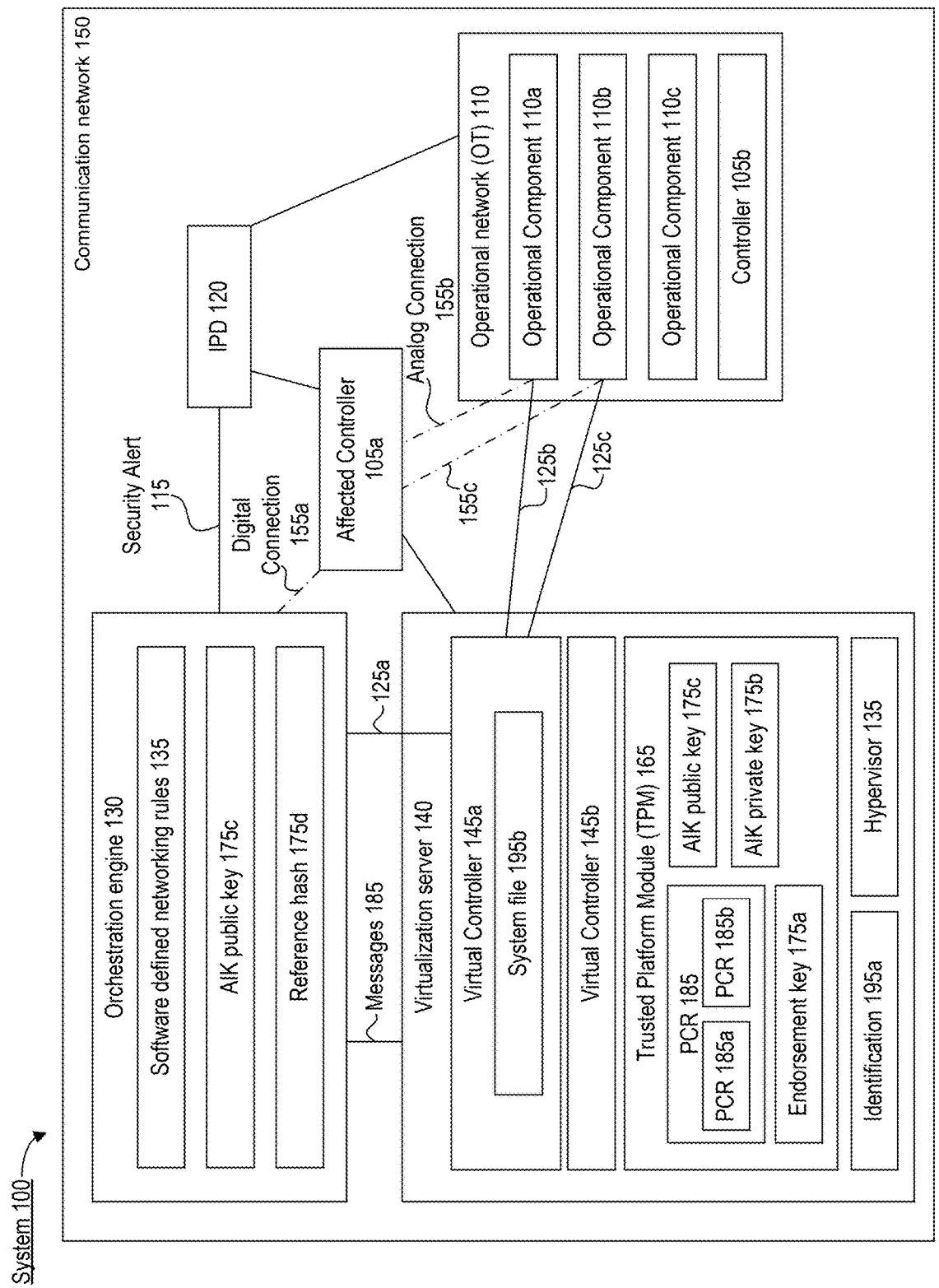
FIG. 1 is a block diagram illustrating a system, according to some embodiments.

Modern industrial control systems (ICS) utilize digital processing to control discrete and analog states of physical processes and functions. An ICS can include an operational technology (OT) network comprising operational components, which are controlled by controllers, such as real-time controllers, programmable logic controllers (PLCs), or the like. Human machine interfaces (HMI) can utilize industrial control protocols to send commands to allow humans to operate the ICS. The PLCs can provide an interface via analog signals and relay inputs and outputs with a variety of operational components (valves sensors, generators, variable frequency drives, etc.) of the OT network to control physical processes for which the ICS is designed. The PLCs can use control protocols to send commands to each other and to the operational components of the OT networks. PLCs are just some examples of controllers. While application of the method in the current disclosure is described for a PLC, it is apparent to one skilled in the art that the description can be applied to any programmable automation controller, e.g. PLC, Remote Terminal Unit (RTU), Process Automation Controller (PAC), and not limited to PLCs.

Conventionally, the ICS is vulnerable to a wide variety of cyberattacks. A successful cyberattack on any single component of the OT network of the ICS can often be enough to degrade, halt, or destroy the control system of the ICS.

In one example, an identification, protection, and detection (IPD) framework is a system that combines specialized hardware and software to identify the components of an ICS, detect cyberattacks and other anomalous behavior, and generate alerts in real time about potential attack events. Although these IPD frameworks can alert humans to the presence of a cyberattack, anomaly, or failure condition of the ICS, IPD frameworks may not be able to directly or automatically mitigate the damage caused by a cyberattack or component failure of an OT network of the ICS.

Some techniques to improve the security for an ICS including OT networks can leverage the "castle wall" or "security wall" approach for cybersecurity of ICS. Strong cyber perimeters, e.g., security walls, may be implemented for an ICS with highly vulnerable internal components. When security walls are breached, operators can physically locate the affected controller, which can be a challenge in a large and sometimes hazardous industrial environment. After locating the affected device, operators may employ safe shutdown procedures to lead the ICS to enter a safe state. In addition, operations may be performed on the controller to clean up the affected controller, such as re-flashing the logic or firmware of the controller. Finally, if all else fails, operators may physically replace the affected controller. Such a process to remedy the situation after detecting the breach of the security wall may be inefficient and often take days/weeks/months to finish.

In some embodiments, supervisory control and data acquisition (SCADA) techniques can make networks large and remotely accessible. However, such larger networks can result in more targets for larger security attacks and higher likelihood for security implementation errors. In addition, SCADA based techniques do not allow an ICS network to recover automatically from a cyberattack.

Some techniques to improve the security for an ICS including OT networks can adopt redundancy using duplicated PLCs. However, redundant or duplicated PLCs can be very costly with increased device footprints, and may still be ineffective versus a competent cyber adversary because the same security attack may work for the duplicated PLC.

Embodiments herein can provide resiliency in an ICS having an OT network. Resilience of the ICS may refer to the ability of the ICS to retain functionality of the ICS when one or more components of the ICS are under security attack. Resilience of the ICS may also refer to the ability of the ICS to provide rapid response and recovery capabilities despite effective cyberattacks against one or many components of the ICS. Embodiments herein can utilize virtualization, cryptographic attestation, software defined networking, security orchestration, and more, to advance the trust and resilience of controllers while facilitating integration of virtual controllers into existing systems to maintain the functionality of the ICS under attack.

Embodiments herein can increase the resiliency of an ICS by adding a virtualization server and an orchestration engine to the ICS, which can facilitate virtualization on demand. The virtualization server can have physical connections or analog connections to the operational components (valves, sensors, generators, etc.) and network connections that are digital connections to all controllers, such as PLCs and HMIs. The virtualization server can have the ability to spawn one or many specialized virtual machines or containers, each with a dynamically generated software stack that can simulate the application of any given controller on the ICS network. In addition, the orchestration engine can be a software component capable of re-routing both industrial control protocols and analog communications within the OT network of the ICS. When an IPD framework generates an alert indicating a cyberattack against a controller of the ICS or an operational component of the OT network, this alert will be passed to the orchestration engine. The orchestration engine can command the virtualization server to instantiate a virtual machine, a virtual controller, or a container running a simulated version of the operations and logic of the affected controller. Once the virtual controller has been instantiated, the orchestration engine may use software-defined networking rules and control of analog connections to effectively quarantine the affected controller from both the network of the ICS and operational components. Afterwards, the orchestration engine can route all traffic intended for the affected controller to the newly spawned virtual controller and give the virtual controller control of the relevant operational components.

In some embodiments, the virtualized environment of the virtual controller is a software, operating system, and hardware stack that can be separate from those of the actual controllers. In one example, attacks that are successful against physical controllers are unlikely to be usable against virtual controllers. In one aspect, the control system of the ICS can continue to function with minimal interruption despite the cyberattack. After a human operator patches the affected controller's vulnerabilities and mitigates the effects of the attack, the orchestration engine can allow the affected controller to resume control and shut down the virtual controller.

In some embodiments, the virtual controller can leverage controller containerization, input/output (I/O) multiplexing, and orchestration to respond to cyber incidents and ensure continuity of the processes performed by the ICS. Containerized virtual controllers can interact with their physical ICS environments and automatically respond and recover from cyber incidents or attacks. Accordingly, embodiments herein can provide logical asset flexibility through hardware agnosticism and resiliency through guest isolation of the virtual controllers. In some embodiments, a hardware interpreter can be developed to translate the logical state of a container controller to input/output (I/O) actions. The hardware interpreter can overcome the traditional reliance of the physical controller on direct hardware access, which may not be supported by guest isolation. Accordingly, techniques in embodiments can be applicable to preexisting systems by allowing a control system to transition from traditional to containerized controllers.

In some embodiments, virtualization generates a guest environment segmented from the host machine's hardware using a hypervisor to interpret and allocate its available computing resources. In one aspect, segmentation can provide a lack of reliance on a specific host, resulting in a more dynamic computing environment, as a virtual environment can rapidly change hosts as needed to ensure maximum uptime. In one aspect, segmentation can provide the isolation between the guest and the host can mitigate malicious processes from spreading to host hardware. In one aspect, segmentation can provide the hardware abstraction that virtualization provides. Segmentation is cost effective compared to installing and maintaining dedicated hardware for each process that can be virtualized. For example, the ability to virtually test and seamlessly merge software updates and configuration changes with little to no downtime could prove impactful to these systems.

Embodiments herein present the virtualization of PLCs to enable these aspects within the OT domain while supporting existing systems and the domain's unique operational constraints with the envisioned future being a more dynamic, trusted, and cost-effective cyber-physical domain.

Embodiments herein can present techniques to cryptographically attest a virtualized PLC runtime via a trusted platform module. Moreover, embodiments herein can present techniques to develop a virtualized PLC environment generation approach that leverages existing system hardware and software artifacts to streamline a backfit deployment. Embodiments herein can further perform automated security orchestration in response to a PLC's failure to cryptographically attest.

FIG. 1 is a block diagram illustrating a system 100, according to some embodiments. For example, system 100 may provide system resiliency by way of virtual controllers in an ICS having an OT network.

In some embodiments, system 100 can include an OT network 110, an IPD 120, an orchestration engine 130, a virtualization server 140, which may be coupled by a communication network 150. OT network 110 can include a plurality of operational components, such as an operational component 110a, an operational component 110b, and an operational component 110c. One or more controllers, such as a controller 105a and a controller 105b, may be coupled to or included in OT network 110 to control operations of the set of operational components of OT network 110. For the sake of discussion, a controller may be under cyber attack, which may be referred to as an affected controller. For example, controller 105a may be an affected controller.

In some embodiments, communication network 150 may include a portion of an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

In some embodiments, communication network 150 may also include a part of a cloud computing system that delivers computing as a service, whereby sharing resources, services, etc. Cloud computing system may provide computation, software, data access, storage, and/or other services that do not require end-user knowledge of a physical location and configuration of a system and/or a device that delivers the services. The cloud-based computing resource(s) of cloud computing system can be dynamically re-allocated based on demand. The cloud-based computing resources may include one or more server farms/clusters including a collection of computer servers that can be co-located with network switches and/or routers.

In some embodiments, OT network 110 can include operational component 110a, operational component 110b, operational component 110c, and other operational components. The set of operational components of OT network 110 can include a sensor, a generator, a frequency drive, an actuator, a valve, a lighting device, a surveillance, a human machine interface, or a functional device. OT network 110 can use hardware and software to monitor and control physical processes, devices, and infrastructure. OT network 110 can be used across a large range of asset-intensive sectors, performing a wide variety of tasks ranging from monitoring critical infrastructure (CI) to controlling robots on a manufacturing floor. OT network 110 can be used in a variety of industries including manufacturing, oil and gas, electrical generation and distribution, aviation, maritime, rail, and utilities.

In some embodiments, OT network 110 can be used for connecting, monitoring, managing, and securing an organization's industrial operations. Businesses engaged in activities such as manufacturing, mining, oil and gas, utilities, and transportation, among many others, can rely heavily on OT network 110. OT network 110 can be used by ICS implementing Supervisory control and data acquisition (SCADA) techniques. For example, OT network 110 used in smart buildings can include elevators, lighting, HVAC, surveillance, or essentially, anything attached to the building. In some organizations, OT network 110 may be separated from the information technology (IT) network used by the organization, which may be used to provide information for human users instead of controlling physical processes.

In some embodiments, controller 105a may be coupled to orchestration engine 130 through a connection 155a. In addition, controller 105a may be coupled to a set of operational components of OT network 110 through one or more connections, such as being coupled to operational component 110a through connection 155b, and being coupled to operational component 110b through connection 155c. Connection 155a, connection 155b, and connection 155c form a set of connections through which controller 105a is coupled to orchestration engine 130 and a set of operational components. Some connections, such as connection 155a may be a digital connection through which digital signals may be transmitted. Some connections, such as connection 155b, may be an analog connection through which analog signals may be transmitted. A digital connection may also transmit analog signals in addition to carrying digital signals. Furthermore, controller 105a can perform a set of functions for the set of operational components including operational component 110a, operational component 110b.

In some embodiments, IPD 120 can detect a security attack against an affected controller, such as controller 105a, and send a security alert 115 to orchestration engine 130. Orchestration engine 130 can communicate with virtualization server 140 to instruct virtualization server 140 to instantiate a virtual controller 145a to perform the set of functions performed by the affected controller 105a. In some embodiments, controller 105b may be under attack and become an affected controller as well. Accordingly, orchestration engine 130 can communicate with virtualization server 140 to instruct virtualization server 140 to instantiate a virtual controller 145b to perform the set of functions performed by the affected controller 105b. Orchestration engine 130 can communicate with virtualization server 140 by a sequence of messages 186, which are shown in more detail in FIG. 3. Orchestration engine 130 can further perform operations, as illustrated in process 200 shown in FIG. 2.

Figure 3:
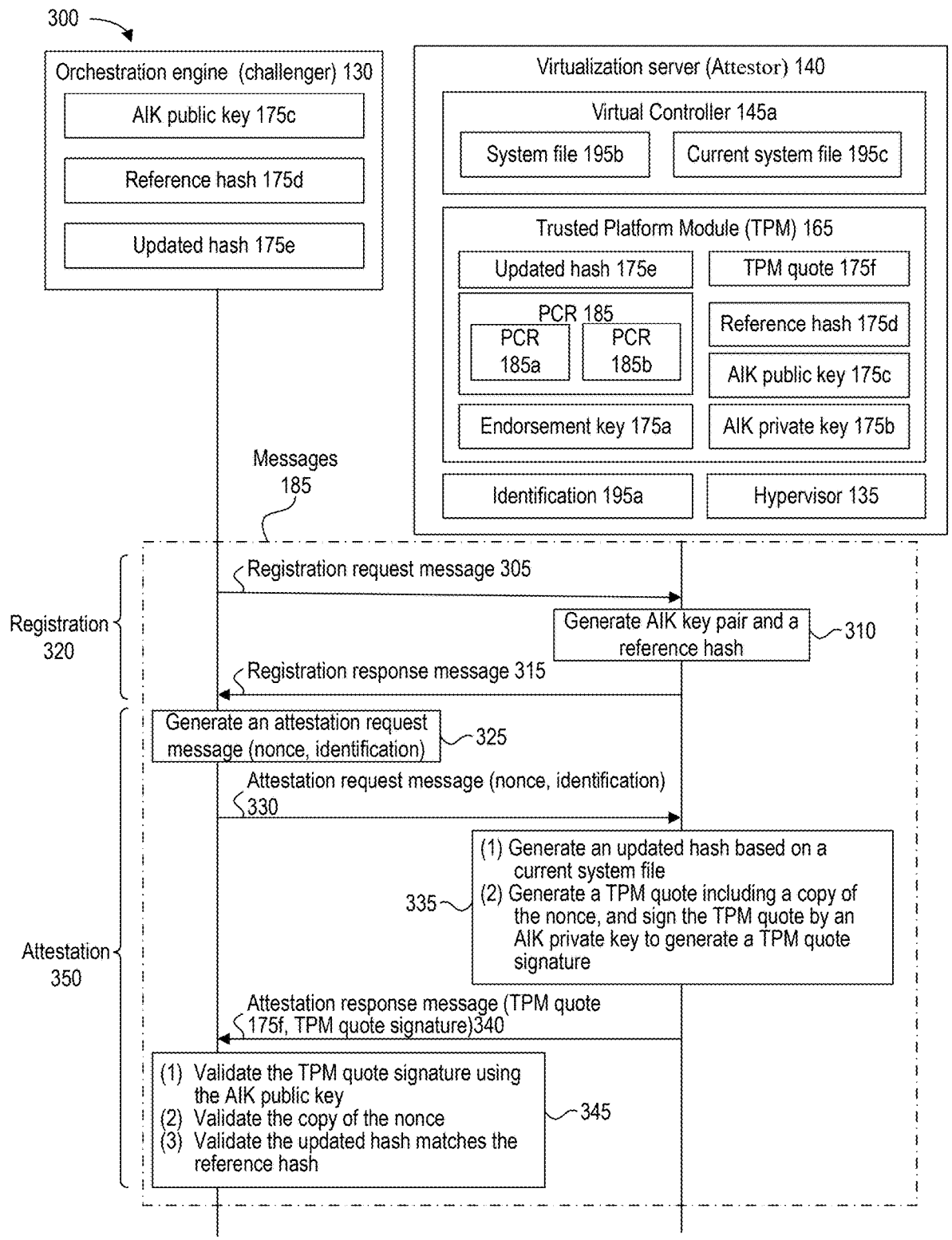
FIG. 3 is a diagram illustrating an example process for performing operations, according to some embodiments.

In some embodiments, virtualization server 140 can include a trusted platform module (TPM) 165, where TPM 165 can include a plurality of platform configuration registers (PCRs) 185. The plurality of PCRs 185 can include a first portion of PCRs 185a corresponding to an identification of hardware 195a for TPM 165 and a second portion of PCRs 185b corresponding to a system file 195b of virtual controller 145a generated by virtualization server 140. Virtualization server 140 can generate a reference hash 175d using the plurality of PCRs 185, and further transmit reference hash 175d to orchestration engine 130 through messages 186, which represent a sequence of messages exchanged between orchestration engine 130 and virtualization server 140 as shown in FIG. 3.

Figure 2:
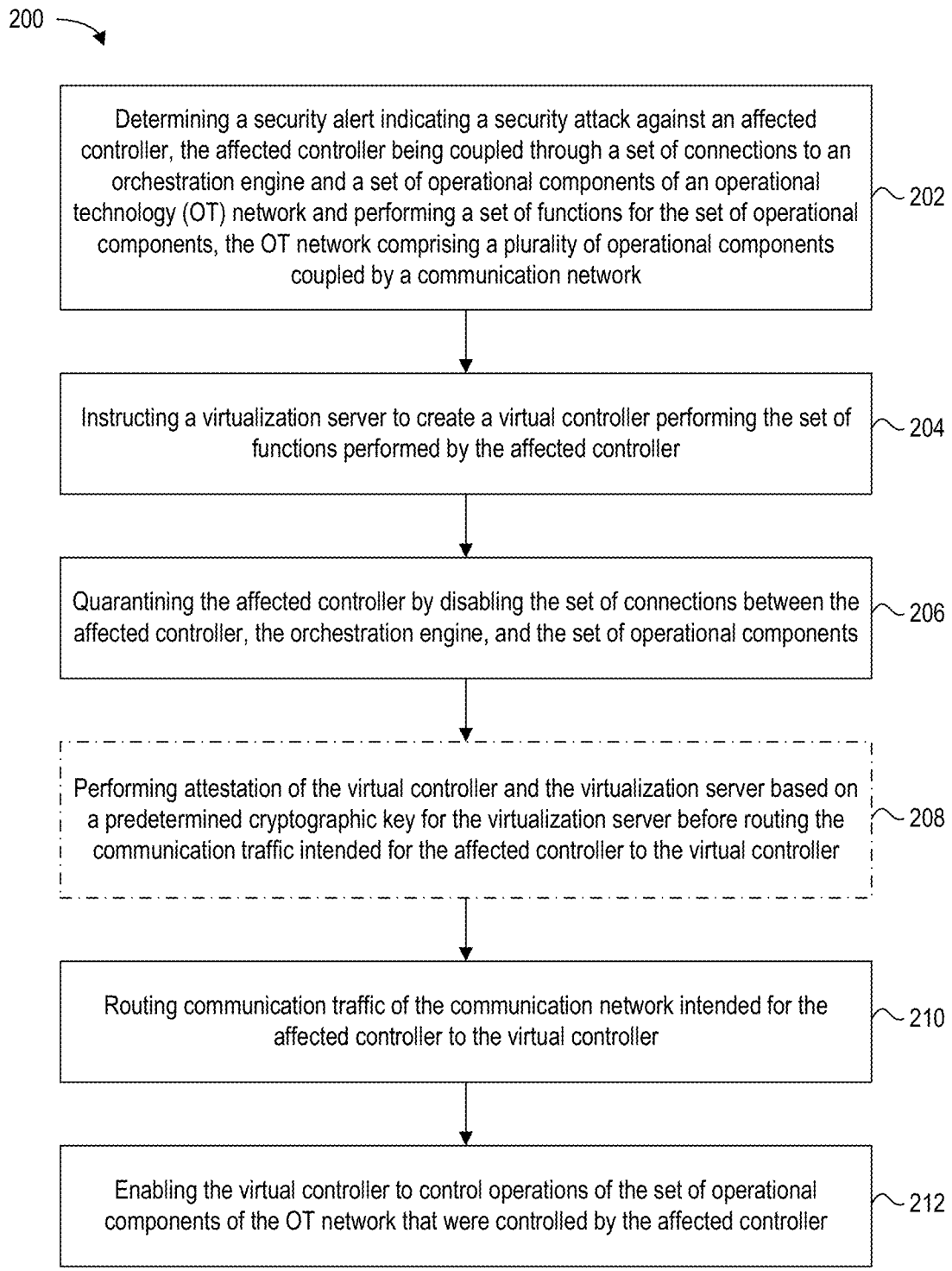
FIG. 2 is a diagram illustrating an example process for performing operations, according to some embodiments.

FIG. 2 is a diagram illustrating an example process 200, according to some embodiments. For example, process 200 can perform operations by an orchestration engine, e.g., orchestration engine 130, to provide system resiliency by way of virtual controllers in an ICS such as system 100 having OT network 110. Process 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

At 202, orchestration engine 130 can determine the security alert 115 is received, which indicates a security attack against an affected controller, such as controller 105a.

At 204, orchestration engine 130 can instruct virtualization server 140 to instantiate virtual controller 145a performing the set of functions performed by the affected controller 105a. In some embodiments, virtual controller 145a is managed by a hypervisor 136 managed by virtualization server 140.

At 206, orchestration engine 130 can quarantine the affected controller 105a by disabling the set of connections between the affected controller 105a, orchestration engine 130, and the set of operational components. For example, orchestration engine 130 can disable the set of connections between the affected controller, the orchestration engine, and the set of operational components, which includes connection 155a coupled to orchestration engine 130, connection 155b coupled to operational component 110a, and connection 155c coupled to operational component 110b. In some embodiments, orchestration engine 130 can disable the set of connections based on software-defined networking rules 135 to control the digital communication connection 155a and the analog connection 155b.

At 208, in some embodiments, orchestration engine 130 can optionally perform attestation of virtual controller 145a and virtualization server 140 based on a predetermined cryptographic key for the virtualization server. In some embodiments, orchestration engine 130 can perform attestation before routing communication traffic intended for the affected controller 105a to virtual controller 145a. In some embodiments, the predetermined cryptographic key can be an endorsement key 175a that is an asymmetric key uniquely determined for a trusted platform module (TPM) 165 of virtualization server 140. The attestation of virtual controller 145a and virtualization server 140 can be performed based on endorsement key 175a along with an attestation identity key (AIK) pair including an AIK private key 175b and an AIK public key 175c.

At 210, orchestration engine 130 can route communication traffic of communication network 150 intended for the affected controller 105a to virtual controller 145a. To route communication traffic of communication network 150 intended for the affected controller 105a to virtual controller 145a, orchestration engine 130 can enable a set of connections between virtual controller 145a, orchestration engine 130, and the set of operational components including operational component 110a and operational component 110b. For example, orchestration engine 130 can enable a connection 125a between virtual controller 145a and orchestration engine 130, a connection 125b between virtual controller 145a and operational component 110a, and a connection 125c between virtual controller 145a and operational component 110b. In some embodiments, connection 125a may be a digital connection corresponding to connection 155a, while connection 125b may be an analog connection corresponding to connection 155b.

At 212, orchestration engine 130 can enable virtual controller 145a to control operations of the set of operational components of OT network 110 that were controlled by the affected controller 105a. For example, orchestration engine 130 can enable virtual controller 145a to control operations of operational component 110a and operational component 110b to perform the same functions as when operational component 110a and operational component 110b were controlled by the affected controller 105a.

In some embodiments, operations shown in process 200 are for examples only, and additional operations may be performed. In some embodiments, after the affected controller 105a has been quarantined, an operator, a machine, or orchestration engine 130 can perform operations on the affected controller 105a to detect any damages caused by the security attack indicated by the security alert 115, and may repair any damages needed to have the affected controller 105a function properly again. Afterwards, orchestration engine 130 may determine that the affected controller 105a is safe with respect to the security attack, and further re-enable the set of connections between the affected controller 105a, the orchestration engine 130, and the set of operational components. For example, orchestration engine 130 may re-enable connection 155a between orchestration engine 130 and the affected controller 105a, connection 155b between operational component 110a and the affected controller 105a, and connection 155c between operational component 110b and the affected controller 105a. In addition, orchestration engine 130 may disable virtual controller 145a from being able to control the operations of the set of operational components such as operational component 110a and operational component 110b, and re-enable the affected controller 105a to control the operations of the set of operational components.

In some embodiments, the affected controller 105a can be a first affected controller, the virtual controller 145a is a first virtual controller. Orchestration engine 130 can determine a second security alert indicating a second security attack against a second affected controller, such as controller 105b. The second affected controller, e.g., controller 105b, can be coupled through a second set of connections, not shown, to orchestration engine 130 and a second set of operational components of OT network 110. The second affected controller can perform a second set of functions for the second set of operational components. Orchestration engine 130 can further instruct virtualization server 140 to instantiate a second virtual controller, e.g., virtual controller 145b, performing the second set of functions performed by controller 105b. Orchestration engine 130 can further quarantine controller 105b by disabling the second set of connections between controller 105b, orchestration engine 130, and the second set of operational components. Afterwards, orchestration engine 130 can route communication traffic of communication network 150 intended for controller 105b to virtual controller 145b, and further enable virtual controller 145b to control operations of the second set of operational component of OT network 110 that were controlled by controller 105b.

FIG. 3 is a diagram illustrating an example process 300, according to some embodiments. For example, process 300 may perform operations by orchestration engine 130 and virtualization server 140 to provide system resiliency by way of virtual controllers in an OT network. Process 300 may show the details of messages 186 exchanged for orchestration engine 130 as a challenger to attest virtualization server 140 as an attestor and virtual controller 145a. Process 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

In some embodiments, at 320, orchestration engine 130 can register virtualization server 140 and virtual controller 145a with orchestration engine 130. In some embodiments, some details of operations performed at 320 are shown below that include operations performed at 305, 310, and 315.

At 305, orchestration engine 130 can send a registration request message to register virtualization server 140 and virtual controller 145a.

At 310, TPM 165 of virtualization server 140 can generate the AIK key pair including AIK private key 175b and AIK public key 175c. In addition, TPM 165 or virtualization server 140 can generate reference hash 175d using the plurality of PCRs 185. The plurality of PCRs 185 includes the first portion of PCRs 185a corresponding to identification of hardware 195a for the TPM 165 and a second portion of PCRs 185b corresponding to system file 195b of virtual controller 145a.

At 315, orchestration engine 130 can receive a registration response message that includes AIK public key 175c generated by TPM 165. The registration response message can also include a digital signature signed by endorsement key 175a. The registration response message can also include reference hash 175d, which is produced using the plurality of PCRs 185 within the TPM 165.

In some embodiments, after registering virtualization server 140 and virtual controller 145a with orchestration engine 130 at 320, orchestration engine 130 can perform attestation of virtual controller 145a and virtualization server 140. Operations for the attestation can be performed at 350, which include operations performed at 325, 330, 335, 340, and 345.

At 325, orchestration engine 130 can generate an attestation request message, where the attestation request message can include a random nonce and an identification of the second portion of the plurality of PCRs 185b corresponding to virtual controller 140.

At 330, orchestration engine 130 can send the attestation request message to virtualization server 140.

At 335, virtualization server 140 can generate an updated hash 175e based on current system file 195c, and further generate a TPM quote 175f including a copy of the nonce, and sign TPM quote 175f by AIK private key 175b to generate a TMP quote signature.

At 340, orchestration engine 130 can receive an attestation response message including TPM quote 175f, the TPM quote including updated hash 175e and a copy of the random nonce, and TPM quote 175f is signed with a TPM quote signature generated by AIK private key 175b.

At 345, orchestration engine 130 can perform attestation of virtual controller 145a and virtualization server 140. Orchestration engine 130 can determine, using AIK public key 175c, whether the TPM quote signature generated by AIK private key 175b is valid. Orchestration engine 130 can further determine that the copy of the random nonce included in TPM quote 175f is valid in comparison with the random nonce.

Orchestration engine 130 can further determine whether virtual controller 145a and virtualization server 140 have been successfully attested based on whether the updated hash 175e included in TPM quote 175f and received in the attestation response message matches reference hash 175d received during the registration process 320.

Figure 4:
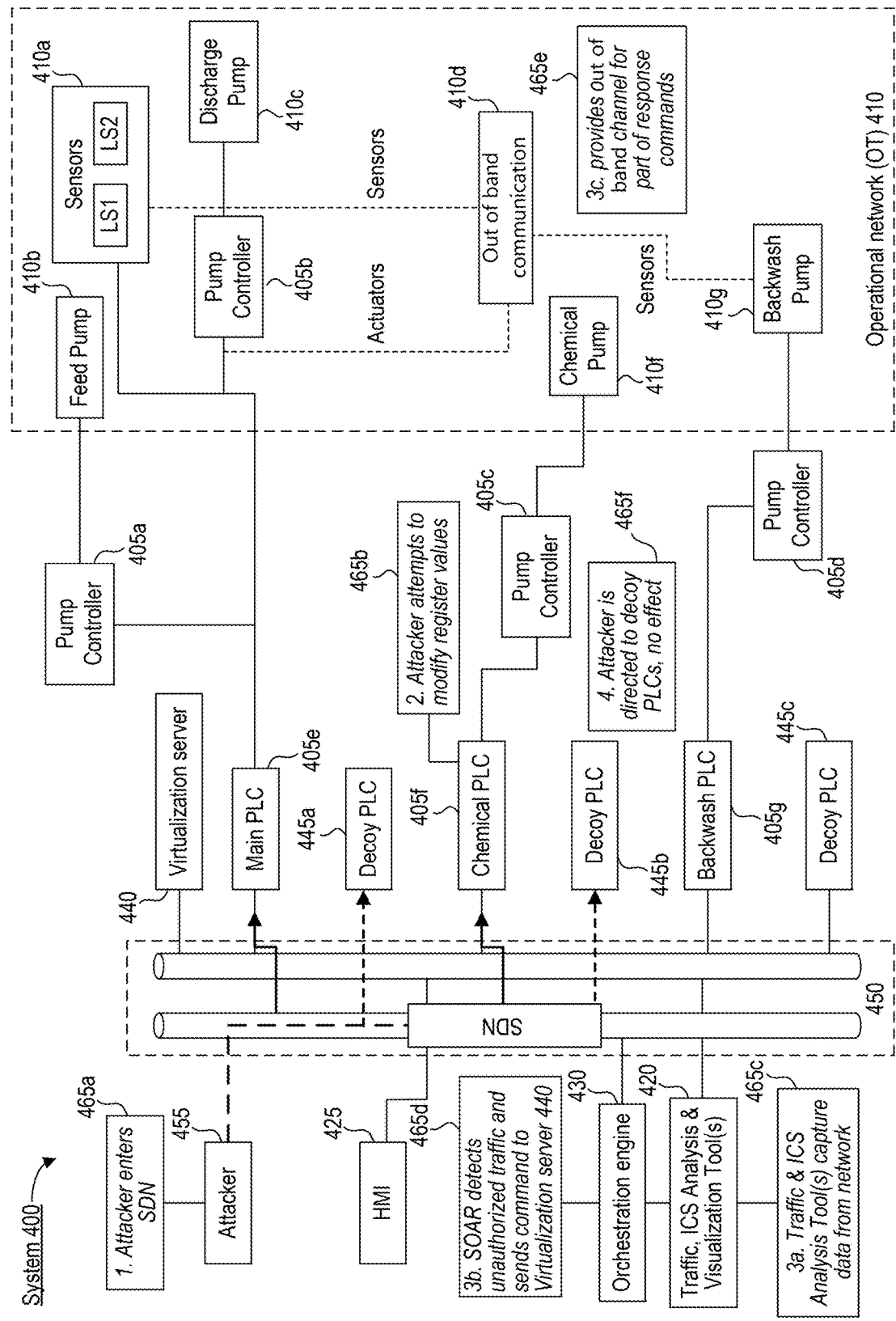
FIG. 4 is a diagram illustrating systems, according to some embodiments.

FIG. 4 illustrates a system 400, according to some embodiments. For example, system 400 can including an OT network 410, an IPD 420, an orchestration engine 430, a virtualization server 440, which may be coupled by a communication network 450. OT network 410, IPD 420, orchestration engine 430, virtualization server 440, and communication network 450 may respectively be examples of OT network 110, IPD 120, orchestration engine 130, virtualization server 140, and communication network 150 as shown in FIG. 1. In some embodiments, communication network 450 may be a software defined network (SDN).

System 400 may represent an ICS for controlling a municipal water filtration plant. OT network 410 can control a physical process of water filtration. OT network 410 may be coupled to devices or equipment of various stages of a water filtration process that may include sedimentation, filtration, or chemical disinfection. Accordingly, OT network 410 may be coupled to equipment including a raw water source tank, a sedimentation tank, a filtration tank, a discharge tank, a chemical injection tank, and a finished water tank, not shown.

In some embodiments, system 400 can include various controllers, such as pump controller 405a, pump controller 405b, pump controller 405c, and pump controller 405d, main PLC 405e, chemical PLC 405f, backwash PLC 405g, and a HMI 425. In some embodiments, pump controllers, such as pump controller 405a may have capacity or power for controlling functions different from the PLCs, such as main PLC 405e or chemical PLC 405f. For example, pump controller 405a may control the operations of operational components of OT network 410 by analog signals, while the PLCs, such as main PLC 405e or chemical PLC 405f may be coupled to the pump controllers and communication network 450 by digital communication techniques. In some embodiments, PLCs, such as main PLC 405e, chemical PLC 405f, backwash PLC 405g, are real-time systems which receive inputs from sensors, execute pre-programmed logical routines, and energize outputs that ultimately drive physical actuators. These devices and their control loops operate a diverse range of physical processes, supporting various ICS and critical infrastructure sectors to include the energy, chemical, manufacturing, water, and wastewater sectors.

In some embodiments, OT network 410 can include a plurality of operational components, such as sensors 410a, feed pump 410b, discharge pump 410c, out-of-band communication components 410d, chemical pump 410f, and backwash pump 410g, in addition to other components such as sensors and actuators. In some embodiments, operations components, such as sensors 410a, feed pump 410b, discharge pump 410c, chemical pump 410f, and backwash pump 410g, may be coupled to the various controllers such as pump controller 405a, pump controller 405b, pump controller 405c, and pump controller 405c. Furthermore, a pump controller, such as pump controller 405a, pump controller 405b, pump controller 405c, and pump controller 405d can be coupled to main PLC 405e, chemical PLC 405f, backwash PLC 405g, which are further coupled to communication network 450.

In some embodiments, out of band communication can be used to collect data generated by the actuators and sensors and provide an ability to covertly transmit ground truth data that is undetectable by an adversary.

In some embodiments, an attacker 455 can target a water treatment facility that has implemented system 400. Using software, hardware, and procedures, system 400 can allow operators and analysts to identify, characterize, and recover from the attack. For example, at 465a, attacker 455 can enter SDN communication network 450. At 465b, attacker 455 can attempt to change the plant set point on chemical injection pump 410f, without HMI 425 showing the change.

Attacker 455 can send a Modbus TCP message directly to chemical PLC 405f to overwrite the register/coil that controls the set point of chemical pump 410f while simultaneously sending fake "normal" Modbus TCP messages to main PLC 405e to mask the attack from the operator display. In some embodiments, at 465c, IPD 420 can perform traffic analysis using ICS analysis and visualization tool to detect the attack on chemical PLC 405f. IPD 420 may use the ability of out-of-band communication unit 410d to covertly transmit ground truth data that is undetectable by an adversary. IPD 420 may send an alert to orchestration engine 430. At 465d, orchestration engine 430 can send a command to virtualization server 440 through SDN communication network 450 so that virtualization server 440 can generate a virtual controller, which can be a decoy PLC 445b. Decoy PLC 445b can have the decoy or deception capabilities to divert attacker 455 to a high-quality decoy. Hence, by virtualization of industrial components, decoy PLC 445b can mitigate a physical attack or malware attack. At 465e, out of band communication unit 410d can provide OOB channel for part of response commands. At 465f, attacker 455 may direct the attacks to decoy PLC 445b, which may not have any real effect on system 400. At a result, the attack is not successful. Water quality, plant operation, and ICS are unaffected. Data collection by out of band communications can allow system 400 to response and recover, as well as the ability for filling the protection gaps. In addition, orchestration engine 430 can send a command to virtualization server 440 through SDN communication network 450 so that virtualization server 440 can generate other virtual controllers, such as decoy PLC 445a for main PLC 405e, and decoy PLC 445c for backwash PLC 405g.

Embodiments herein have demonstrated that techniques can be combined with open source tools to provide a robust, resilient approach to ICS cybersecurity for both detection and mitigation. These resilient ICS technologies are high Technology Readiness Level (TRL), low-cost, and can be integrated into other applications or services, including a smart power grid.

Embodiments herein have demonstrated that SDN communication network can leverage virtual controller, such as virtual PLC, technology to instantiate high fidelity decoys. The attacker is able to interact with these decoys while having no effect on the physical environment. From the perspective of the attacker, the attack is a complete success, while in actuality, the attacker is communicating with a decoy PLC, while operations on the physical system 400 are unaffected. The decoy or deception capability provided by the SDN communication network 450, demonstrate the ability to divert an intruder to a high-quality decoy to protect critical equipment while providing opportunity to gain intelligence about the intruder's tactics.

Embodiments herein have demonstrated that virtual controllers to control system 400 in the event of a compromise. An operator can safely remove the affected PLC, while system 400 can still able to function properly to perform at a nominal rate. At the meantime, the affected PLC can undergo forensic analysis to recover from the security attack. Accordingly, embodiments herein can have the ability to protect, respond, and recover technologies for ICS. Virtual controllers combined with an active response tool demonstrate that a physical attack or malware attack can be mitigated by transferring control of a critical process from an industrial controller to a virtual instance.

Figure 5A:
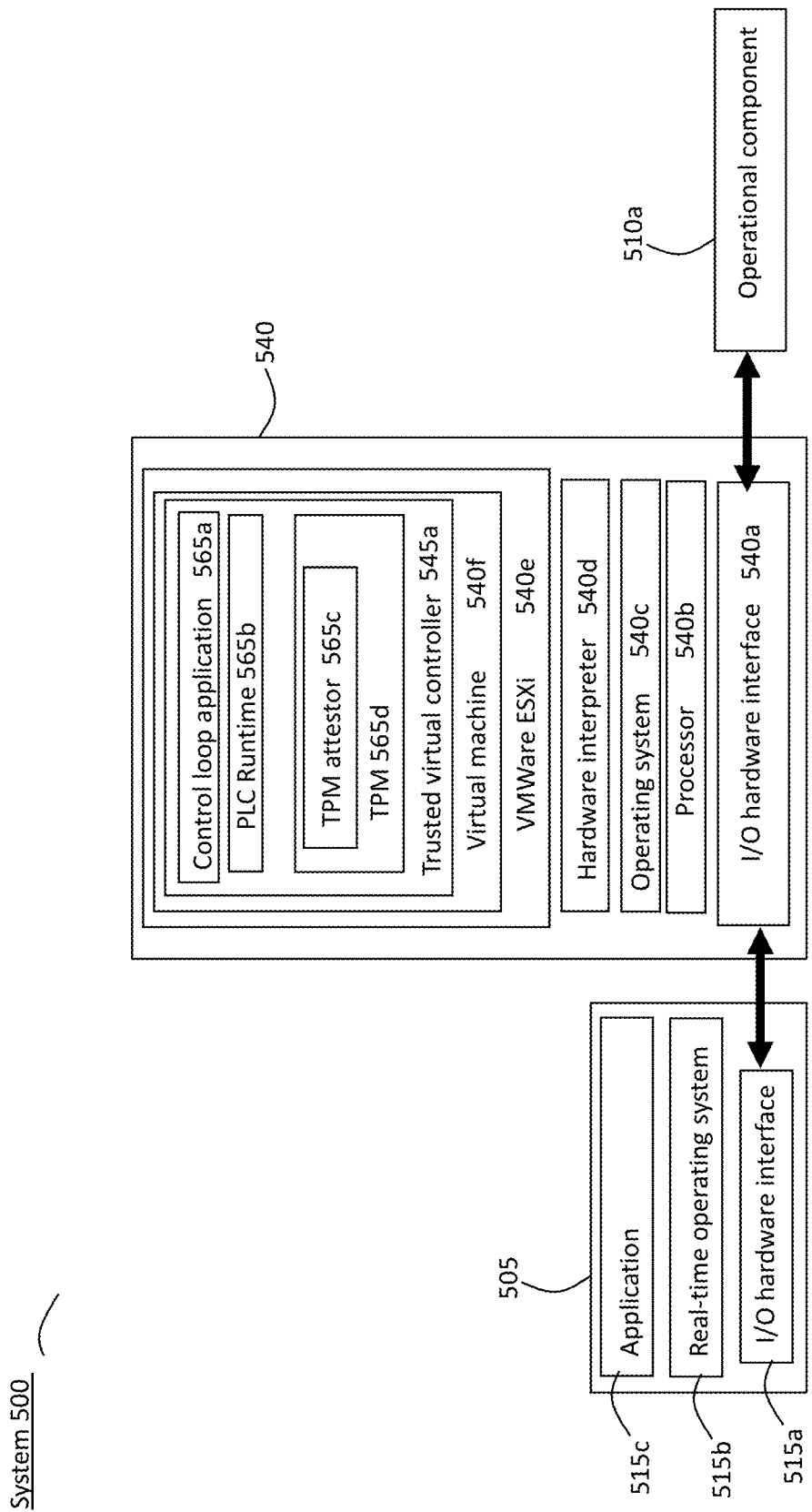
FIGS. 5A-5B are diagrams illustrating systems, according to some embodiments.
Figure 5B:
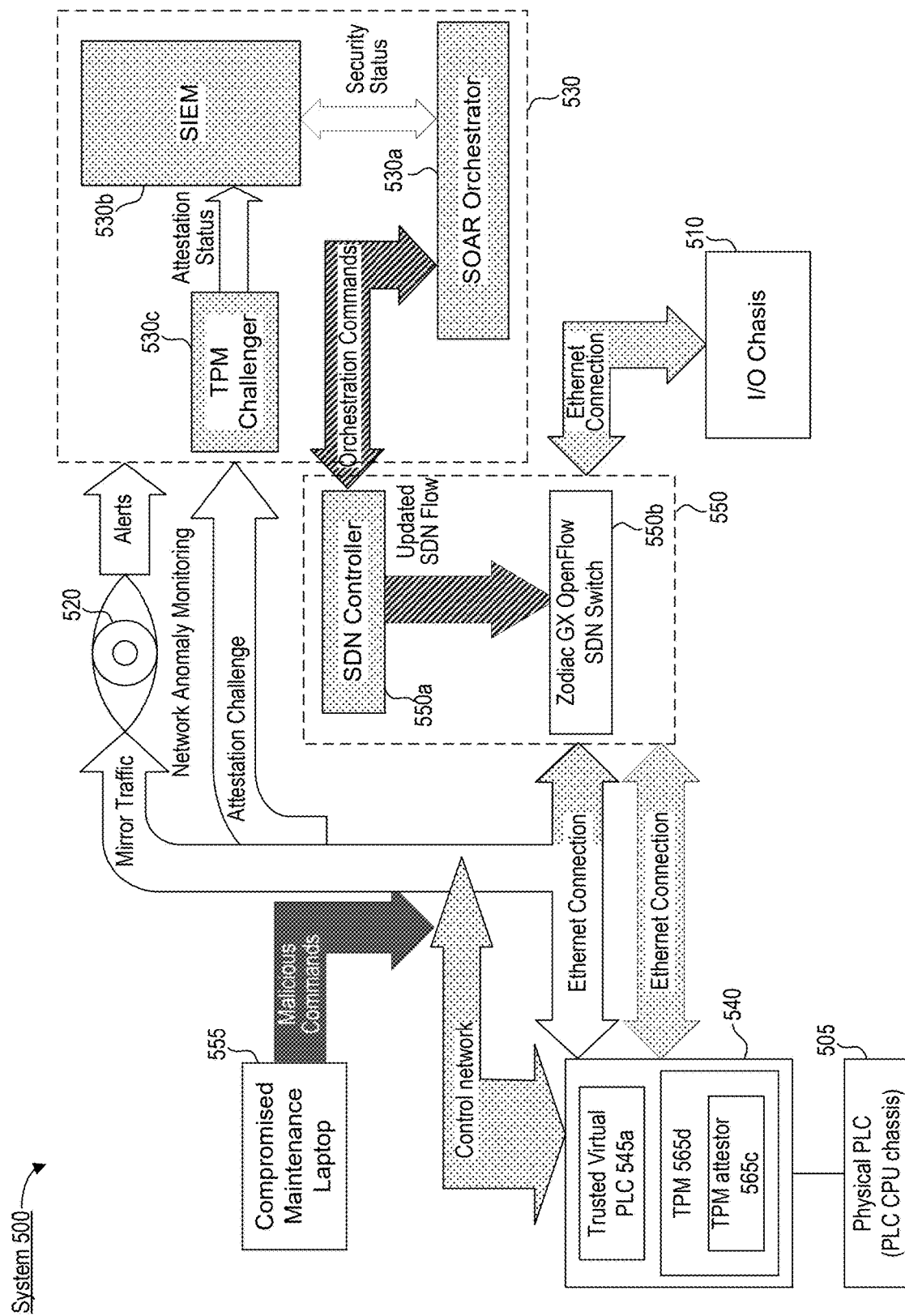

FIGS. 5A-5B are diagrams illustrating a system 500, according to some embodiments. For example, system 500 can provide resiliency by way of virtual controllers in an ICS having an OT network. In some embodiments, system 500 can be an example of system 100, process 300, or system 400, and can be used in various applications such as controlling a power distribution network via a HMI to open and close contactors and manipulate the flow of power to a target load. System 500 can include a virtualization server 540, a PLC 505 that is a physical PLC instead of a virtual controller, and an OT network 510 including operational component 510a, in addition to other components such as an IPD 520, a SDN communication network 550, and an orchestration engine 530. More details of the connections between virtualization server 540, PLC 505, and operational component 510a are shown in FIG. 5A, while details of system 500 are shown in FIG. 5B.

FIG. 5A illustrates virtualization server 540 coupled to PLC 505. Virtualization server 540 can include an I/O hardware interface 540a, a processor 540b, an operating system 540c, and a hardware interpreter 540d. Processor 540b can be an Intel Next Unit of Computing (NUC). Operating system 540c can be Ubuntu 20.04 host OS. I/O hardware interface 540a can be coupled to operational component 510a of an OT network through analog connection. I/O hardware interface 540a can also be coupled to an I/O hardware interface 515a of PLC 505 through analog connection. PLC 505 can have direct hardware access to control operational component 510a through analog connections instead of digital connections. PLC 505 can further include a real-time operating system 515b and an application 515c. Hardware interpreter 540d can translate the logic state of a virtual controller, which may be in a digital state, into analog input/output (I/O) actions to control operational component 510a.

In some embodiments, processor 540b can host a virtual controller 545a, which may be a trusted virtual controller having TPM hardware that can be used to validate the Ubuntu 20.04 host OS as well as the logic file of virtual controller 545a. Virtual controller 545a can be instantiated by launching a PLC runtime 565b, such as SoftLogix 5800 PLC runtime, in a windows 10 virtual machine 540f Virtual machine 540f can be hosted by processor 540b running an Ubuntu 20.04 operating system. PLC runtime 565b can be virtualized using VMWare ESXi 540e and executed as a high-priority real-time OS process. Virtual controller 545a can further includes a TPM attestor 565c within TPM 565d and a control loop application 565a. TPM attestor 565c can act as an attestor to implement remote attestation where the challenger can be an orchestration.

In some embodiments, the logic and configuration from the existing physical PLC 505 can be retrieved and used to configure virtual controller 545a. Any hardware references in the original logic and configuration for the physical PLC 505 can be changed to virtual controller 545a and remote I/O. In some embodiments, the reconfiguration process can be completely automated, e.g., using Allen Bradley's proprietary software Studio 5000. Embodiments herein may use various vendors and products, such as Intel NUC, SoftLogix 5800 PLC runtime, Ubuntu 20.04 host OS, merely as examples. Many other vendors and products can offer comparable functions, and embodiments can support other vendors and products or open-source runtime solution.

In some embodiments, virtual controller 545a may mirror the physical PLC's control behavior, and utilize the existing hardware and wiring installation to achieve system control. The process to virtualize the physical PLC could be automated and be capable of ingesting existing system software artifacts. Accordingly, virtual controller 545a can function properly and minimize the cost and effort associated with their adoption. In some embodiments, virtual controller 545a can inherit the ability to seamlessly interface with the existing PLC's ecosystem, to include software and hardware. Accordingly, no logic reprogramming has to be performed. This execution of identical logic ensures that the virtual controller's control loop would be identical, resulting in identical process execution. In some embodiments, an additional benefit of virtualization is the ability to implement various security and trust mechanisms to the host and runtime, which could be unavailable to a proprietary hardware PLC solution such as a duplicated PLC to replace the physical PLC in response to a security attack.

FIG. 5B illustrates more details of system 500. System 500 can enable the trusted virtual controller 545a in a security environment to automate alert, analysis, and response.

In some embodiments, system 500 can include IPD 520, SDN communication network 550, orchestration engine 530, physical PLC 505, coupled to virtualization server 540. IPD 520 can be a rule-based intrusion detection system (IDS) configured with a ruleset to detect and alert on the modification of PLC logic, which may be caused by an attacker using a compromised laptop 555. Communication network 550 can include a SDN controller 550a and a switch 550b. Orchestration engine 530 can include a security orchestration, automation, and response (SOAR) tool in a SOAR orchestrator 530a. SDN controller 550a can be programmed to redirect network traffic from physical PLC 505 to the virtual controller 545a via commands sent to the SDN switch 550b. The SOAR tool can be configured with the automated actions to ingest IDS alerts, request the status of the virtual controller's attestation, interface with the SDN controller 550a to enact SDN-based network modifications, and prompt an operator to perform a manual action. In some embodiments, virtual controller 545a and virtualization server 540, and physical PLC 505 are coupled to communication network 550. With both virtual and physical PLCs using remote I/O in OT network 510 through the SDN switch 550b, the process of replacing physical PLC 505 by virtual controller 545a could be made completely automated. Orchestration engine 530 can further include a security information and event management (SIEM) unit 530b to aggregate various system indicators and facilitates mitigation responses. Orchestration engine 530 can further include a TPM challenger 530c to perform attestation for virtual controller 545a and virtualization server 540, following operations of process 300 as shown in FIG. 3.

In some embodiments, due to the potentially critical processes PLCs control, trusting these devices is paramount to having confidence in process continuity and outcome. Additionally, the virtualization with virtual controllers can introduce new vulnerabilities unique to the information technology (IT) domain. Embodiments herein present a method to affirm the trust of virtual controller 545a and virtualization server 540. TPM challenger 530c and TPM attestor 565c can leverage cryptographic keys generated during the manufacturing process for virtualization server 540 to perform remote attestation. Attestation performed can ensure the legitimacy of a networked device and its software.

In remote attestation, as previously shown in FIG. 3, there exists a challenger host system that attempts to verify the internal state of another attestor system. The end goal of the attestation is to allow the attestor to generate a signed TPM quote that proves to the challenger that the internal state of the system matches the expected state. The virtual controller can implement remote attestation where the challenger is a Linux orchestration server and the attestor is the Intel NUC that hosts the virtual controller.

In some embodiments, the first step in the attestation process is a one-time device registration. At this step, the challenger sends a request to register with the attestor, and the attestor generates an endorsement key (EK) along with an attestation identity key (AIK) pair. The EK is an asymmetric key that is unique to the TPM on the device. The AIK is generated by the TPM and is signed by the EK. The next step in the registration is to compute the reference hash for the challenger. The reference hash is produced using the platform configuration registers (PCR) that are within the TPM. These registers can only be modified using a hash extension, which will overwrite any previous existing values. Since extension is the only path to overwrite values, the PCR hash values will reflect all the history of the hash extensions. The attestor is sent the specific PCR to use for the hash computation. One portion of the registers is left untouched and is used for identifying the TPM hardware; the other set of registers is extended with the hash of a file that reflects what logic is being used by the virtual controller. The file reflecting the logic is a proprietary Allen Bradley project file with the extension 'acd'. The acd file being used is contained in the SoftLogix program files and is labeled 'slot02.acd'. Slot 2 in the SoftLogix program can be the CPU of the virtual controller and the acd file in the file path location corresponds to the specific logic with which the CPU is currently programmed. Once the hash is computed, the AIK public key and hash are sent to the challenger, thus finishing the registration process.

With the registration is completed, the challenger can be ready to verify the internal state of the attestor at any time. To do so, the challenger will send a request to the attestor to read the PCR registers from which the computed hash was derived as well as a generated random nonce. The attestor computes the hash of the current acd file for Slot 02 and overwrites that hash into the PCR corresponding to the device's software. With the PCR up to date, the attestor generates a TPM quote for the challenger using the PCR values and signs it with the private AIK. When the challenger receives the TPM quote, it first checks that the nonce and quote signature are valid. Lastly, it verifies that the PCR values received match the computed hash in the registration process. If any of the mentioned checks fail, it indicates that the internal state of the system has been modified. If the checks pass, then the internal state reflects what is expected, and the attestation has successfully passed.

The result of the virtual controller's attestation check can be provided to the SIEM unit, which aggregates various system indicators and facilitates mitigation responses. If the STEM reported that a virtual controller failed to cryptographically attest its trustworthiness, the virtual controller may not be given control of the physical system and specific response actions could be taken to mitigate the situation.

In some embodiments, the attacker can use compromised laptop 555 to perform various attacks under different attacker models. The model can leverage trusted access to reprogram a PLC, resulting in reduced system functionality. This model's deployment of a trusted but malicious configuration represents a witting or unwitting insider threat, the compromise of a trusted device, or supply chain compromise.

In some embodiments, the attacker model can be exercised in three scenarios. The first scenario can execute the attacker model against the system's physical PLC with no resiliency enhancements. The attacker can modify the PLC's programming which resulted in an expected degradation of system behavior. Utilization of network situational awareness tools enabled a timely identification of the rogue machine and diagnosis of anomalous system behavior. Even so, the attacker model's configuration change continued to persist until manual reconfiguration could occur. Manual reconfiguration can take hours to weeks depending on a system's complexity and scale, the damage caused, and process sensitivity. Live duplicate systems are a common redundancy method but are still susceptible to the same attack due to the dependence on identical hardware and software.

In some embodiments, in the second scenario, the physical PLC can be compromised again; however, the network situational awareness tools enabled automated system recovery leveraging the trusted virtual controller approach. This contrasts with scenario one, where utilizing this same network data only resulted in threat identification and system behavior diagnosis. The attacker's actions triggered a SOAR workflow, which requested the virtual controller's attestation status. Given that the virtual controller's configuration is untouched, the virtual controller can pass the attestation check and be given responsibility for the systems control loop via the SOAR's SDN orchestration. The SDN network reconfiguration can take place after the operator is prompted to remove the infected PLC CPU from the system. This CPU removal further purges the system of malicious artifacts and ensures there is no conflict over the I/O with the remaining PLC chassis. Corrective actions can be accomplished within seconds.

The third attack scenario can execute the attacker model against both physical and trusted virtual controllers. Due to the trusted status of the compromised maintenance laptop, a malicious configuration can be accepted by both devices. When the SOAR has executed its workflow for transitioning system control from physical PLC to virtual controller, the SOAR workflow can command an attestation check of the virtual controller. In some embodiments, the virtual controller can fail to attest due to the discrepancy between the expected configuration and currently loaded malicious configuration. This failure to attest can result in a complete loss of trust and confidence in the virtual controller's configuration and the SOAR's workflow can diverge to compensate. The SOAR can then make an operator recommendation to revert to the snapshot of the virtual controller in a known good configuration. While this action is given to an operator, it could easily be automated via scripting or Application Programming Interface (API) calls. After reverting to the snapshot state, the device can pass the attestation check and be given physical system control via the SOAR's SDN orchestration after PLC chassis CPU removal. This process can take one minute to complete, with the result being the semi-automated transition to a trusted system.

In some embodiments, automated validation of virtual controller generation can be performed. This validation could be performed using a simulation environment for stimulation of virtual controller execution or an automated comparison of the cryptographic hashes between physical and virtual controller programming.

Comparing the outcomes between scenarios one and two showcases the automated resiliency benefits the virtual controller approach provides. This is evidenced by continuity of the control process, and by the execution speed advantages associated with automated recovery compared to manual recovery. Furthermore, comparing the outcomes between scenarios two and three shows the importance of system trust while also demonstrating the virtual controller's flexibility. This is evidenced by continuity of the control system process despite initial virtual controller compromise by a trusted host. It is also worth noting that the virtual controller's added flexibility facilitates the implementation of additional security mechanisms that a proprietary PLC system may not support, reducing the likelihood of compromise and introducing new host-based data sources. This approach's trusted flexibility, paired with means to augment existing and proprietary environments enables these systems to take dynamic actions in support of their processes and could play a pivotal role in securing both existing and future systems all the while introducing the cost-savings and high-availability benefits of virtualization.

Figure 6:
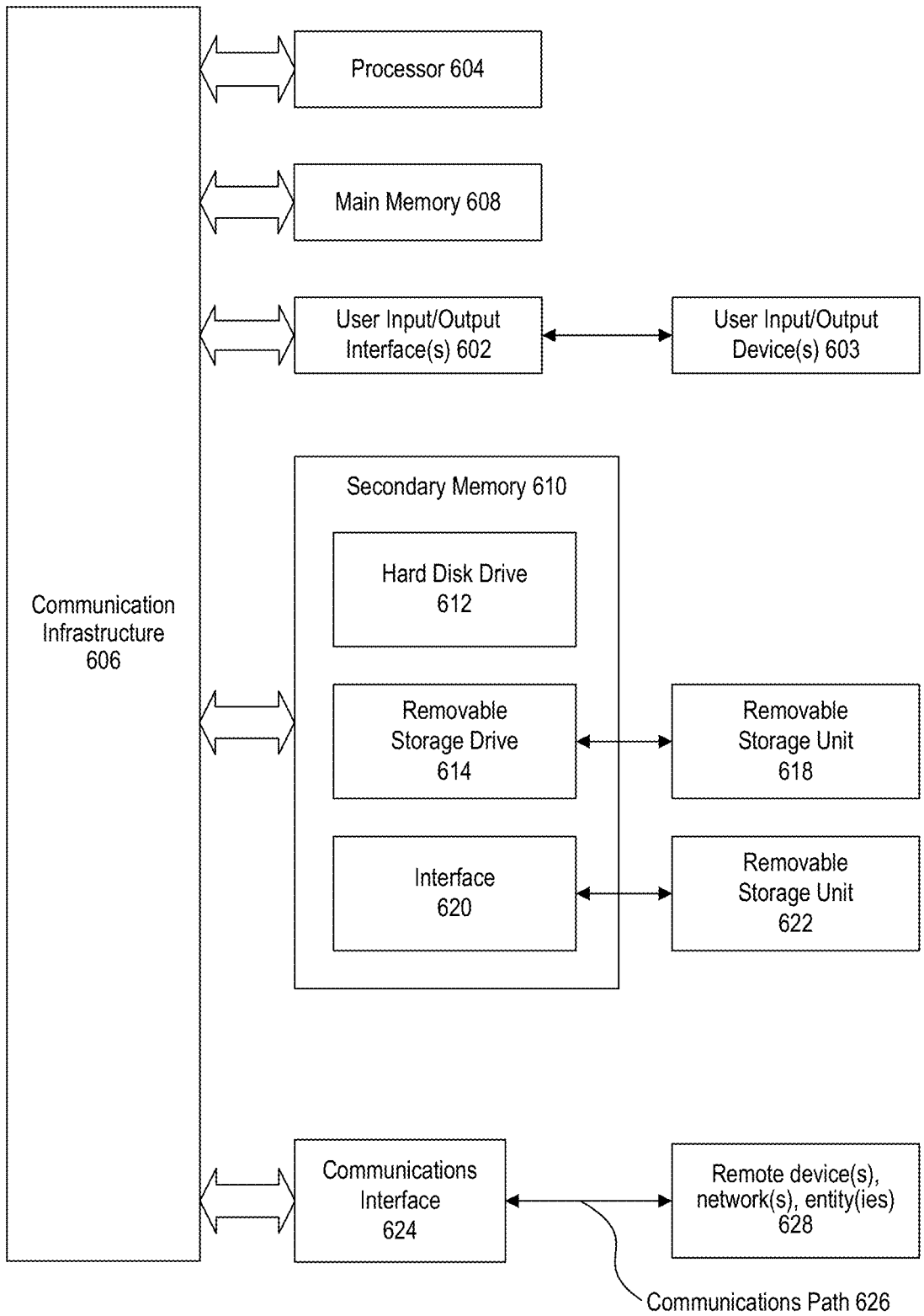
FIG. 6 is a diagram illustrating an example computer system useful for implementing various embodiments.

Various embodiments can be implemented, for example, using one or more computer systems, such as computer system 600 shown in FIG. 6. Computer system 600 can be used, for example, to implement process 200 of FIG. 2 and process 300 of FIG. 3. For example, computer system 600 can implement and execute a set of instructions comprising operations to provide system resiliency in an ICS having an OT network by way of virtual controllers, as shown in FIGS. 1, 3, 4, 5A-5B. Computer system 600 can be any computer capable of performing the functions described herein.

Computer system 600 can be any well-known computer capable of performing the functions described herein.

Computer system 600 includes one or more processors (also called central processing units, or CPUs), such as a processor 604. Processor 604 is connected to communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings that are different from those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
determining, by an identification, protection, and detection (IPD) framework, a security alert indicating a security attack against an affected controller, the affected controller being coupled through a set of connections including a digital connection to an orchestration engine through which digital signals are transmitted and connections to a set of operational components of an operational technology (OT) network including an analog connection to another controller of the OT network through which analog signals are transmitted, and the affected controller being configured to perform a set of functions for the set of operational components, the OT network comprising a plurality of operational components coupled by a communication network;
instructing, by the orchestration engine, a virtualization server to instantiate a virtual controller performing the set of functions performed by the affected controller;
quarantining, by the orchestration engine, the affected controller by disabling the set of connections including the digital connection and the analog connection between the affected controller, the orchestration engine, and the set of operational components;
routing, by the orchestration engine, communication traffic of the communication network intended for the affected controller to the virtual controller; and
enabling, by the orchestration engine, the virtual controller to control operations of the set of operational components of the OT network that were controlled by the affected controller.

2. The method of claim 1, further comprising:
determining, after the affected controller has been quarantined, that the affected controller is safe with respect to the security attack;

re-enabling the set of connections between the affected controller, the orchestration engine, and the set of operational components;

disabling the virtual controller from being able to control the operations of the set of operational components; and re-enabling the affected controller to control the operations of the set of operational components.

3. The method of claim 1, wherein the virtual controller is managed by a hypervisor managed by the virtualization server.

4. The method of claim 1, wherein the set of connections includes at least a digital communication connection and the analog connection.

5. The method of claim 4, wherein the quarantining the affected controller comprises disabling the set of connections between the affected controller, the orchestration engine, and the set of operational components based on software-defined networking rules to control the digital communication connection and the analog connection.

6. The method of claim 1, wherein the set of operational components of the OT network includes a sensor, a generator, a frequency drive, an actuator, a valve, a lighting device, a surveillance, a human machine interface, or a functional device.

7. The method of claim 1, wherein the affected controller is a first affected controller, the virtual controller is a first virtual controller, and the method further comprises:

determining a second security alert indicating a second security attack against a second affected controller, the second affected controller being coupled through a second set of connections to the orchestration engine and a second set of operational components of the OT network and performing a second set of functions for the second set of operational components;

instructing the virtualization server to instantiate a second virtual controller performing the second set of functions performed by the second affected controller;

quarantining the second affected controller by disabling the second set of connections between the second affected controller, the orchestration engine, and the second set of operational components;

routing communication traffic of the communication network intended for the second affected controller to the second virtual controller; and enabling the second virtual controller to control operations of the second set of operational component of the OT network that were controlled by the second affected controller.

8. The method of claim 1, further comprising:

performing attestation of the virtual controller and the virtualization server based on a predetermined cryptographic key for the virtualization server before routing the communication traffic intended for the affected controller to the virtual controller.

9. The method of claim 8, wherein:

the predetermined cryptographic key is an endorsement key that is an asymmetric key uniquely determined for a trusted platform module (TPM) of the virtualization server, and the performing attestation of the virtual controller and the virtualization server comprises registering the virtualization server and the virtual controller with the orchestration engine based on the endorsement key along with an attestation identity key (AIK) pair including an AIK public key and an AIK private key.

10. The method of claim 9, wherein the registering the virtualization server and the virtual controller with the orchestration engine comprises:

sending, by the orchestration engine, a registration request message to register the virtualization server and the virtual controller;

receiving the AIK public key generated by the TPM of the virtualization server and signed by the endorsement key; and receiving a reference hash from the virtualization server, wherein the reference hash is produced using a plurality of platform configuration registers (PCRs) within the TPM, and wherein the plurality of PCRs includes a first portion of PCRs corresponding to an identification of hardware for the TPM and a second portion of PCRs corresponding to a system file of the virtual controller generated by the virtualization server.

11. The method of claim 10, wherein, after the registering the virtualization server and the virtual controller with the orchestration engine, the performing attestation of the virtual controller and the virtualization server further comprises:

sending an attestation request message to the virtualization server, the attestation request message comprising a random nonce and an identification of the second portion of the plurality of PCRs corresponding to the virtual controller; and receiving an attestation response message including a TPM quote, the TPM quote comprising an updated hash generated based on a current system file of the virtual controller and a copy of the random nonce, and wherein the TPM quote is signed with a TPM quote signature generated by the AIK private key.

12. The method of claim 11, wherein the performing attestation of the virtual controller and the virtualization server further comprises:

determining, using the AIK public key, the TPM quote signature generated by the AIK private key is valid;

determining that the copy of the random nonce included in the TPM quote is valid in comparison with the random nonce; and determining whether the virtual controller and the virtualization server have been successfully attested based on whether the updated hash included in the TPM quote and received in the attestation response message matches the reference hash.

13. A computing device comprising:

a memory configured to store a reference hash received from a virtualization server; and a processor communicatively coupled to the memory and configured to:

send a registration request message to register the virtualization server and a virtual controller generated by the virtualization server;

receive an attestation identity key (AIK) public key, wherein the AIK public key is configured to be generated by a trusted platform module (TPM) of the virtualization server and configured to be signed by an endorsement key that is an asymmetric key uniquely determined for the TPM;

receive the reference hash from the virtualization server, wherein the reference hash is configured to be produced using a plurality of platform configuration registers (PCRs) within the TPM, wherein the plurality of PCRs comprises a first portion of PCRs corresponding to an identification of hardware for the TPM and a second portion of PCRs corresponding to a system file of the virtual controller generated by the virtualization server;

send an attestation request message to the virtualization server, wherein the attestation request message includes a random nonce and an identification of the second portion of the plurality of PCRs corresponding to the virtual controller; and receive an attestation response message including a TPM quote, wherein the TPM quote includes an updated hash generated based on a current system file of the virtual controller, a copy of the random nonce, and wherein the TPM quote is signed with a TPM quote signature generated by an AIK private key.

14. The computing device of claim 13, wherein the processor is further configured to:

determine, using the AIK public key, the TPM quote signature generated by the AIK private key is valid;

determine that the copy of the random nonce included in the TPM quote is valid in comparison with the random nonce; and determine whether the virtual controller and the virtualization server have been successfully attested based on whether the updated hash included in the TPM quote received in the attestation response message matches the reference hash stored in the memory.

15. The computing device of claim 13, wherein, before sending the registration request message to register the virtualization server, the processor is configured to:

determine a security alert indicating a security attack against an affected controller, the affected controller being coupled through a set of connections to an orchestration engine and a set of operational components of an operational technology (OT) network and performing a set of functions for the set of operational components, the OT network comprising a plurality of operational components coupled by a communication network;

instruct the virtualization server to instantiate the virtual controller performing the set of functions performed by the affected controller performs; and quarantine the affected controller by disabling the set of connections between the affected controller, the orchestration engine, and the set of operational components.

16. The computing device of claim 15, wherein, upon a determination that the virtual controller and the virtualization server have been successfully attested, the processor is configured to:

route communication traffic of the communication network intended for the affected controller to the virtual controller; and enable the virtual controller to control operations of the set of operational component of the OT network that are controlled by the affected controller.

17. The computing device of claim 16, wherein the processor is configured to:

determine, after the affected controller has been quarantined, that the affected controller is safe with respect to the security attack;

re-enable the set of connections between the affected controller, the orchestration engine, and the set of operational components;

disable the virtual controller from being able to control operations of the set of operational components; and re-enable the affected controller to control the operations of the set of operational component.

18. A non-transitory computer-readable medium having instructions stored thereon that, when executed by a computing device, cause the computing device to perform operations comprising:

determining, by an identification, protection, and detection (IPD) framework, a security alert indicating a security attack against an affected controller, the affected controller being coupled through a set of connections including a digital connection to an orchestration engine through which digital signals are transmitted and connections to a set of operational components of an operational technology (OT) network including an analog connection to another controller of the OT network through which analog signals are transmitted, and the affected controller being configured to perform a set of functions for the set of operational components, the OT network comprising a plurality of operational components coupled by a communication network;

instructing, by the orchestration engine, a virtualization server to instantiate a virtual controller performing the set of functions performed by the affected controller performs;

quarantining, by the orchestration engine, the affected controller by disabling the set of connections between the affected controller, the orchestration engine, and the set of operational components;

routing, by the orchestration engine, communication traffic of the communication network intended for the affected controller to the virtual controller; and enabling, by the orchestration engine, the virtual controller to control operations of the set of operational components of the OT network that were controlled by the affected controller.

19. The non-transitory computer-readable medium of claim 18, wherein the operations further comprising:

determining, after the affected controller has been quarantined, that the affected controller is safe with respect to the security attack;

re-enabling the set of connections between the affected controller, the orchestration engine, and the set of operational components;

disabling the virtual controller from being able to control operations of the set of operational components; and re-enabling the affected controller to control the operations of the set of operational components.

20. The non-transitory computer-readable medium of claim 18, wherein the operations further comprising:

registering, before routing the communication traffic intended for the affected controller to the virtual controller, the virtualization server and the virtual controller with the orchestration engine based on an endorsement key that is an asymmetric key uniquely determined for a trusted platform module (TPM) of the virtualization server along with an attestation identity key (AIK) pair including an AIK public key and an AIK private key; and performing attestation of the virtual controller and the virtualization server based on the AIK public key and the AIK private key.

21. The non-transitory computer-readable medium of claim 18, wherein the quarantining the affected controller comprises disabling the set of connections between the affected controller, the orchestration engine, and the set of operational components based on software-defined networking rules to control the digital communication connection and the analog connection.

\* \* \* \* \*